Dec. 31, 1946.  H. C. KRONE ET AL  2,413,571
SELF-SEALING VALVED COUPLING
Filed Sept. 11, 1945  2 Sheets-Sheet 1
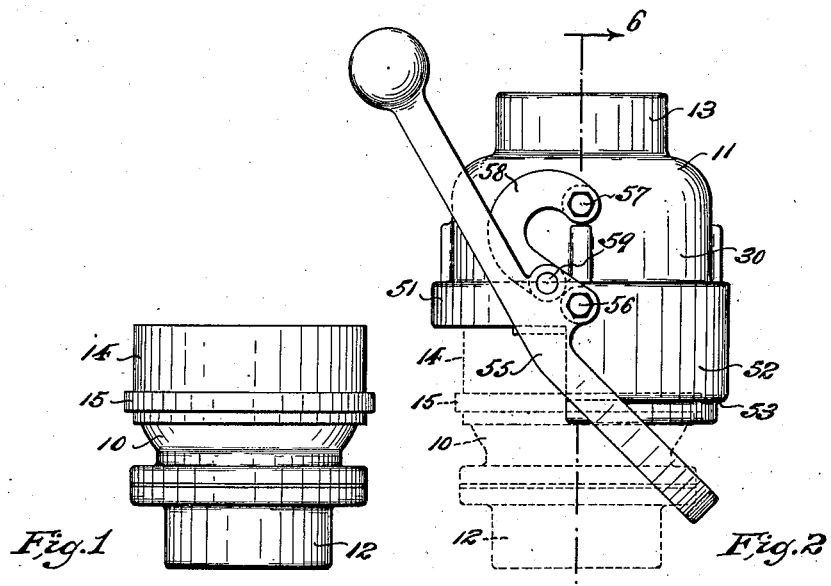
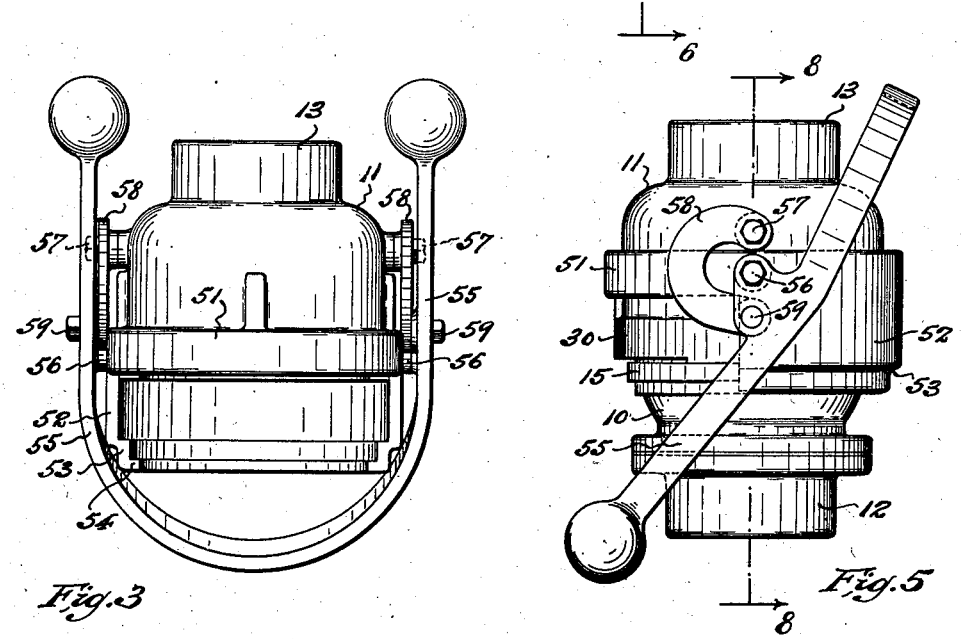
INVENTORS:
Howard C. Krone & William Meyer,
BY George D. Richards
Attorney

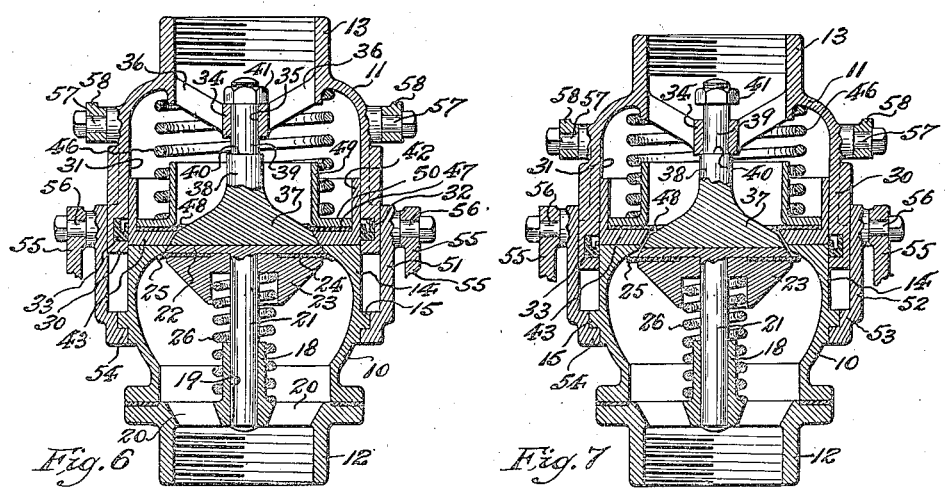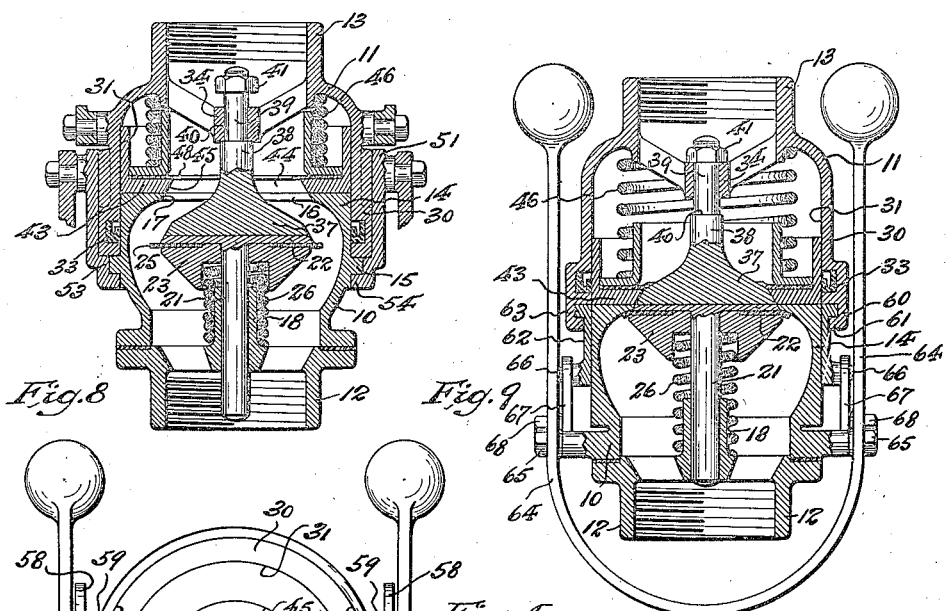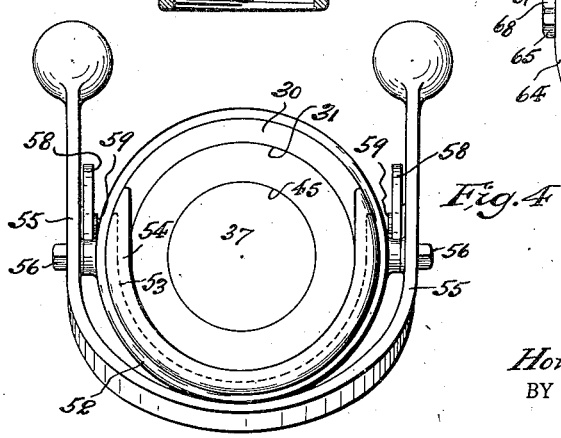

Patented Dec. 31, 1946

2,413,571

UNITED STATES PATENT OFFICE 2,413,571

SELF-SEALING VALVED COUPLING

Howard C. Krone, River Edge, and William Meyer, East Orange, N. J., assignors to Wheaton Brass Works, Newark, N. J., a corporation of New Jersey Application September 11, 1945, Serial No. 615,550

2 Claims. (Cl. 284—19)

This invention relates to improvements in self-sealing valved couplings for fluid conducting lines and the like.

This invention has for an object to provide a novel construction of valved coupling comprising separable but engageable male and female coupling members, each being provided with self-closing valves adapted to automatically close when the coupling members are disengaged or separated one from the other, and wherein neither valve can be opened when the coupling members are separated; the coupling including operating mechanism which cannot be manipulated to open the valve of a coupling member by which it is carried when said coupling member is separated from the other coupling member; and which is only operative to simultaneously open the valves of said coupling members after said coupling members are initially engaged one with the other.

The invention has for another object to provide a novel valved coupling comprising separable but engageable male and female coupling members having novel means for sealing the same against leakage when engaged, wherein movement of the mechanism for locking the coupling members in operative engaged relation initially effects, through said sealing means, a sealing of the engaged coupling members against leakage prior to opening movement of the valves of the latter, and thereafter disposes the sealing means so as to maintain a leak-proof relation of the coupling members while the same are operatively engaged as well as during disengaging manipulation thereof.

Other objects of the invention, not at this time more particularly enumerated, will be understood from the following detailed description of the same.

Illustrative embodiments of the invention are shown in the accompanying drawings, in which:

Fig. 1 is a side elevational view of the male member of the coupling; Fig. 2 is a side elevational view of the female member of the coupling, but showing, by broken line delineation, the position of the male member as initially assembled therewith ready to be locked in operative coupled relation thereto; Fig. 3 is a side elevational view of the female member of the coupling as viewed from the left in Fig. 2; Fig. 4 is a bottom plan view of the female member of the coupling; and Fig. 5 is a side elevational view of the coupling with its male and female members engaged and locked together in operative coupled and valve opening relation.

Fig. 6 is a vertical longitudinal sectional view, taken on line 6—6 in Fig. 2, but showing, by full lines, the position of the male member as initially assembled with the female member ready to be locked in operative coupled relation thereto, the valves of said members being still closed; Fig. 7 is a similar view showing the initial stages of the operation of locking together the male and female members and the sealing of the latter against leakage, the valves thereof being about to open; and Fig. 8 is a similar sectional view, taken on line 8—8 in Fig. 5, the coupling members being operatively locked together and sealed with their valves fully open.

Fig. 9 is a sectional view similar to that of Fig. 6, but showing a modified arrangement and mounting of the operating means, whereby the same is carried by the male member of the coupling instead of the female member, and which includes a protective shield means for guarding surfaces of the male member against injury, when said male member is disengaged and separated from the female member.

Similar characters of reference are employed in the above described views, to indicate corresponding parts.

The illustrative embodiment of the invention shown in Figs. 1 to 8 inclusive comprises a male coupling member 10 and a female coupling member 11; the male coupling member having a neck portion 12 for attachment to a pipe, hose, or other part through which a fluid may flow to or from the same; and the female coupling member having a neck portion 13 for attachment to a pipe, hose, or other part through which a fluid may flow to or from the same.

The male coupling member 10 is provided at its outer or free end with a plug section 14, which is preferably of cylindrical shape. Spaced from the extremity of said plug section 14 is an external annular coupler flange 15. Formed in the end of said plug section 14 is a valve port 16 surrounded by a valve seat 17. Axially disposed within the interior of the male coupling member 10 is a valve guide means 18 having an axial bore 19. Said valve guide means is supported from the walls of said male coupling member by spider arms 20. Slidably mounted in the bore 19 of said valve guide means 18 is the stem 21 of an inwardly opening valve member formed in part by a valve disc 22. When the valve member is closed, the outer face of said valve disc 22 lies flush to the plane of the outer or free end of said plug section 14. Said valve member is streamlined to assure smooth and rapid flow of fluid around the same when it is opened, and to this end is provided on its interior side, and convergent upon its stem 21, with an inverted conical body section 23, the latter being preferably threaded onto the stem 21 so as to abut the interior face of the valve disc 22. Clamped between the meeting faces of the valve disc 22 and body section 23 is an annulus 24 of resilient, fluid impervious material, such e. g. as rubber. The external circumferential marginal part of said annulus 24 projects beyond the periphery of the valve disc 22, whereby to provide a flexible sealing lip 25 adapted, when the valve member is closed, to lap the interior margins of the valve seat 17, so as to positively seal the joint between said seat and the valve disc 22. Said valve member is yieldably urged by a compression spring 26 into seated engagement with the valve seat 17, whereby to normally close the valve port 16.

The female coupling member 11 provides, at its free end portion, an outwardly endwise open body 30 having an internal bore 31 of cross-sectional shape and size to correspond to and thus to telescopically receive the plug section 14 of the male coupling member 10, when the latter is desired to be operatively engaged with the female coupling member. Adjacent to the open mouth of the body 30 of the female coupling member, the walls thereof are provided with an annular housing channel 32 which is open toward said bore 31. Seated within said housing channel 32 is a resilient annular seal member 33. Axially disposed within the interior of the female coupling member 11 is a valve supporting means 34 having an axial bore 35. Said valve supporting means is supported from the walls of the female coupling member by spider arms 36. Suspended from the valve supporting means is an outwardly opening valve member 37 having a stem 38 terminating in an extension 39 of reduced diameter which is slidably entered through the bore 35 of the supporting means 34. At the juncture of said valve stem 38 and its extension 39 is a stop shoulder 40 which, at proper times, is abutted by the inner end of said supporting means 34, for purposes hereinafter to be explained. Affixed to the free end of said valve stem extension 39 is a stop nut 41, or equivalent means, adapted to normally abut the outer end of said supporting means 34, whereby to establish a normal initial position of the valve member 37. Slidably supported by its side walls 42, within the bore 31 of the body 30, is an axially and inwardly movable transverse valve port member 43 which provides a valve port 44 surrounded by a valve seat 45. Said valve port member 43 is yieldably urged by a compression spring 46 to engage its seat 45 with the valve member 37, whereby the latter closes the valve port 44, when said valve member 37 is stopped against downward movement by the engagement of the stop nut 41 with the supporting means 34. Suitably secured to the inner face of the valve port member 43 is an annulus 47 of resilient fluid impervious material, such e. g. as rubber. The internal circumferential marginal part of said annulus 47 projects beyond the periphery of the valve seat 45, whereby to provide a flexible sealing lip 48 adapted, when the valve port 44 is closed by the valve member 37, to lap the marginal portions of the latter so as to positively seal the joint between the same and said seat 45. Preferably said valve port member 43 includes an inner tubular collar 49 having a bottom flange 50 against which the compression spring 46 bears; said annulus 47 being clamped between said bottom flange 50 and the inner face of said valve port member 43.

Cooperative means is provided for initially interengaging the male and female coupling members 10 and 11 subject to being thereupon locked together in operative coupled relation with their valves open to permit flow of fluid therethrough. Means for this purpose may be variously formed and arranged. One form and arrangement of such means, as shown in Figs. 1 to 8 inclusive, comprises a coupler sleeve 51 which is externally mounted on the body 30 of the female coupling member, so as to be axially slidable thereon. At one side thereof, said coupler sleeve 51 is cut away to form a laterally open, approximately semi-circular free end section 52, which is adapted to normally project beyond the mouth end of the body 30 of the female coupling means. Said free end section 52 terminates in an inwardly offset portion 53, the internal diameter of which corresponds to the external diameter of the coupler flange 15 with which the plug section 14 of the male coupling member 10 is provided. Said offset portion in turn terminates in an internal coupler flange 54, the internal diameter of which corresponds to the external diameter of said plug section 14 of the male coupling member 10 (see Figs. 3 and 4).

From an examination of Figs. 1 and 2 more particularly, it will be observed, that to initially engage the male and female coupling members together, preparatory to locking them up in operative coupled relation, the plug section 14 of the male coupling member 10 is moved sidewise through the open side of the free end section 52 of the coupler sleeve 51 which is carried by the female coupling member 11. By such manipulation of the male coupling member, its plug section 14 is carried into axial alignment with the bore 31 of the body 30 of the female coupling member, while at the same time the coupler flange 15 of said plug section 14 is entered in the free end section 52 of the coupler sleeve 51 so that the coupler flange 54 of the latter engages beneath said coupler flange 15. When the male and female coupling members 10 and 11 are thus initially assembled, their respective valve ports 16 and 44, and the valve members by which the latter are closed, are brought into register and axial alignment, with said valve members in face to face opposed relation (see Fig. 6), whereupon the male and female coupling members are ready to be relatively moved axially so as to dispose the same in completely coupled relation with their valve members opened to permit flow of fluid therethrough.

Suitable manipulatable means is provided for relatively moving the initially engaged male and female coupling members to completely coupled relation with their valve members open. Such means may vary widely in form and arrangement. One illustrative form and arrangement of such means is shown in Figs. 1 to 8 inclusive, and comprises lever yoke 55 pivotally connected at points 56 to the sides of the coupler sleeve 51. Pivotally connected at points 57 respectively to opposite sides of the female coupling member 11 are suitably shaped draw-links 58, the opposite ends of which are pivotally connected with arms of the lever yoke 55 at points 59, which are suitably offset from the lever yoke pivot points 56 in direction toward the free or handle ends of said lever yoke arms.

After the coupling member 10 has been initially engaged with the female coupling member 11 in the manner above described, the operator swings down the lever yoke 55 from the normally upswung position shown in Fig. 2 to the downswung position shown in Fig. 5. Such movement of the lever yoke, as pivoted by and upon the draw links 58, produces relative axial movements of the coupler sleeve engaged male and the female coupling members one toward the other. As such movements are initiated, the plug section 14 of the male coupling member moves inwardly against the valve port member 43 of the female coupling member, whereby to begin lifting of the latter against the tension of its control spring 46, and simultaneously the valve member 22 exerts inward thrust upon the valve member 37. Since, however, the latter valve 37 is, by reason of the spacing of its stem shoulder 40 away from the inner end of the supporting member 34, free to move with the valve port member 43 as the stem extension 39 slides in the supporting member 34, said valve member 37 continues to move in company with the valve port member 43 until movement thereof is stopped by abutment of the stem shoulder 40 against said supporting member 43. By reason of such permitted limited movement of the valve 37 in company with the valve port member 43, the former retains its closed relation to the valve port 44 for a limited time during initial movement of the plug section 14 of the male coupling member into the bore 31 of the body 39 of the female coupling member, whereby, before the valves 22—37 begin to open, the sides of said plug section 14 are moved into engagement with the seal member 33, so that the crack at the plane of the meeting faces of the plug section end and valve port member 43 is sealed before and at the moment the valves begin to open, thus very effectively preventing out-spurting of fluid exteriorly of the engaged coupling members at the moment of valve opening (see Fig. 7). Thereafter, as the plug section 14 continues inward movement, and after completion of said inward movement, the sides of said plug section will be constantly engaged by the seal member 33, so that leakage is prevented throughout the time the coupling valves 22—37 are open to fluid passage.

As soon as the inward movement of the valve member 37 is arrested by abutment of its stem shoulder 40 against the supporting member 34, continued inward movement of the plug section 14 of the male coupling member exerts lifting thrust upon the valve port member 43 against the tension of its control spring 46, so that the seat 45 is carried away from the stationary valve 37, thus opening the valve port 44 to fluid flow. At the same time, the movement of the valve 22 in company with the ingoing plug section 14 is arrested by the then stationary valve 37, so that said valve 22 is depressed against the tension of its control spring 26, and thus displaced from the seat 17, whereby to simultaneously open the valve port 16 to fluid flow. As above pointed out, the valve 22 is suitably streamlined to offer minimum resistance to the flow of fluid around the same, and to the same end the valve 37 may be similarly streamlined by providing the same with a conical body convergent upon its stem 38.

From the above it will be apparent that the instant invention provides a very efficient and easily manipulated valved coupling, the parts of which are so constructed and related, and function by such novel mode of operation, that all risk of leakage or exterior spurting of fluid passed therethrough, especially during the moments of valve opening and closing, is effectively guarded against.

Referring now to Fig. 9, there is shown therein a modified form of the valved coupling of this invention, wherein the coupling member interengaging means and associated actuating means have been arranged to provide protection for the smooth exterior sides of the plug section 14 of the male coupling member, whereby the same are guarded against marring, scarring or other injury when exposed, as e. g. when the male coupling member is disengaged and separated from the female coupling member, such as would be the case when attached to the end of a portable hose or otherwise exposed subject to risk of possible injury. To this end, the open end of the body 30 of the female coupling member is provided, as an integral part thereof, with a laterally open coupler section 60 similar to the semicircular free end section 52 of the previously described construction. Said coupler section 60 is provided with an internal coupler flange 61. Externally and slidably mounted on the plug section 14 of the male coupling member is a movable coupler sleeve 62, which is provided at its outer end with an external annular coupler flange 63, adapted to be entered in the laterally open coupler section 60 of the female coupling member, so as to be engaged by the coupler flange 61 of the latter. In this construction, the actuating means, for locking the male and female coupling members together in valve opening relation, is carried by or related to the male coupling member instead of the female coupling member. The illustrative form of said actuating means shown in Fig. 9 comprises a lever yoke 64 pivotally connected at points 65 to opposite sides of the male coupling member. Pivotally connected at points 66 to opposite sides of the coupler sleeve 62 are suitably shaped draw links 67, the opposite ends of which are pivotally connected with the arms of the lever yoke 64 at points 68, which are suitably offset from the lever yoke 65 in direction toward the handle ends of said lever yoke arms.

When the lever yoke 64 is operated, the interengaged coupler sleeve and female coupling member are drawn toward the male coupling member, thus causing the plug section 114 of the latter to be projected from the coupler sleeve 62 and into the bore 31 of the body 30 of the female coupling member, all in the manner and with the same coupling member uniting and valve opening effects as previously set forth in connection with the hereinabove first described construction. It will be noted that, when the actuating means is operated to release the male coupling member from the female coupling member, the coupler sleeve 62 will be retracted on the plug section 14 of the former, so as to be disposed and held in enveloping relation to the external sides thereof, and thus so as to shield and protect the surfaces of said sides from possible injury.

Having now described our invention, we claim:

1. A coupling for connecting fluid conducting lines comprising separable male and female coupling members, said male member having an endwise projecting plug section provided with a valve port in its end and an inwardly yieldable valve to normally close said valve port, said female member having an endwise open body to receive said plug section of the male member, an inwardly yieldable valve port member within said body and a female member valve to normally close the same, means to mount said female member valve whereby to permit limited inward movement thereof, and an internal annular seal member mounted in the walls of said female member body, said valve port member and the female member valve being adapted to yield to initial movement of said plug section and male member valve into said female member body, whereby to engage said plug section with said seal member before said valves are permitted to open, whereafter upon arresting of the female valve member at its limit of inward movement, continued inward movement of said plug section displaces said valve port member from said female member valve and causes the latter to displace said male member valve from said plug section valve port.

2. A coupling for connecting fluid conducting lines comprising separable male and female coupling members, said male member having an endwise projecting plug section provided with a valve port in its end and an inwardly yieldable valve to normally close said valve port, said female member having an endwise open body to receive said plug section of the male member, an inwardly yieldable valve port member within said body and a female member valve to normally close the same, means to mount said female member valve whereby to permit limited inward movement thereof, an internal annular seal member mounted in the walls of said female member body, said valve port member and the female member valve being adapted to yield to initial movement of said plug section and male member valve into said female member body, whereby to engage said plug section with said seal member before said valves are permitted to open, whereafter upon arresting of the female valve member at its limit of inward movement, continued inward movement of said plug section displaces said valve port member from said female member valve and causes the latter to displace said male member valve from said plug section valve port, said male and female members having cooperative means for detachably interengaging the one with the other so that said plug section and valve of the male member are opposed to and in axial alignment respectively with the valve port member and valve of the female member, and manipulatable actuating means operative to produce relative axial movement of the interengaged male and female members, whereby to effect the aforesaid movement of the male member plug section into the female member body.

HOWARD C. KRONE.
WILLIAM MEYER.